June 25, 1929.  R. L. CARTER  1,718,275
COMBINED ROUTER AND WORK SUPPORT
Filed Aug. 13, 1927  4 Sheets-Sheet 1
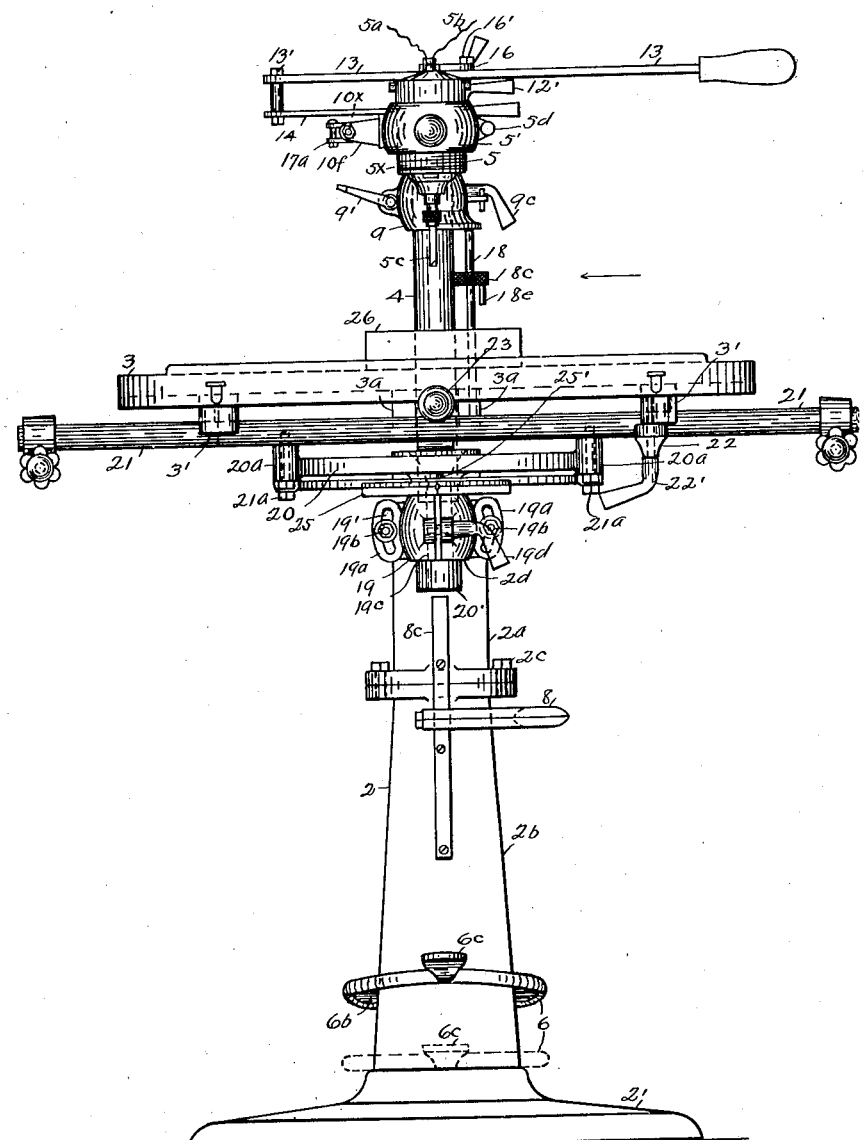
Inventor.
Ray L. Carter.
By Harry De Wallace
Attorney.

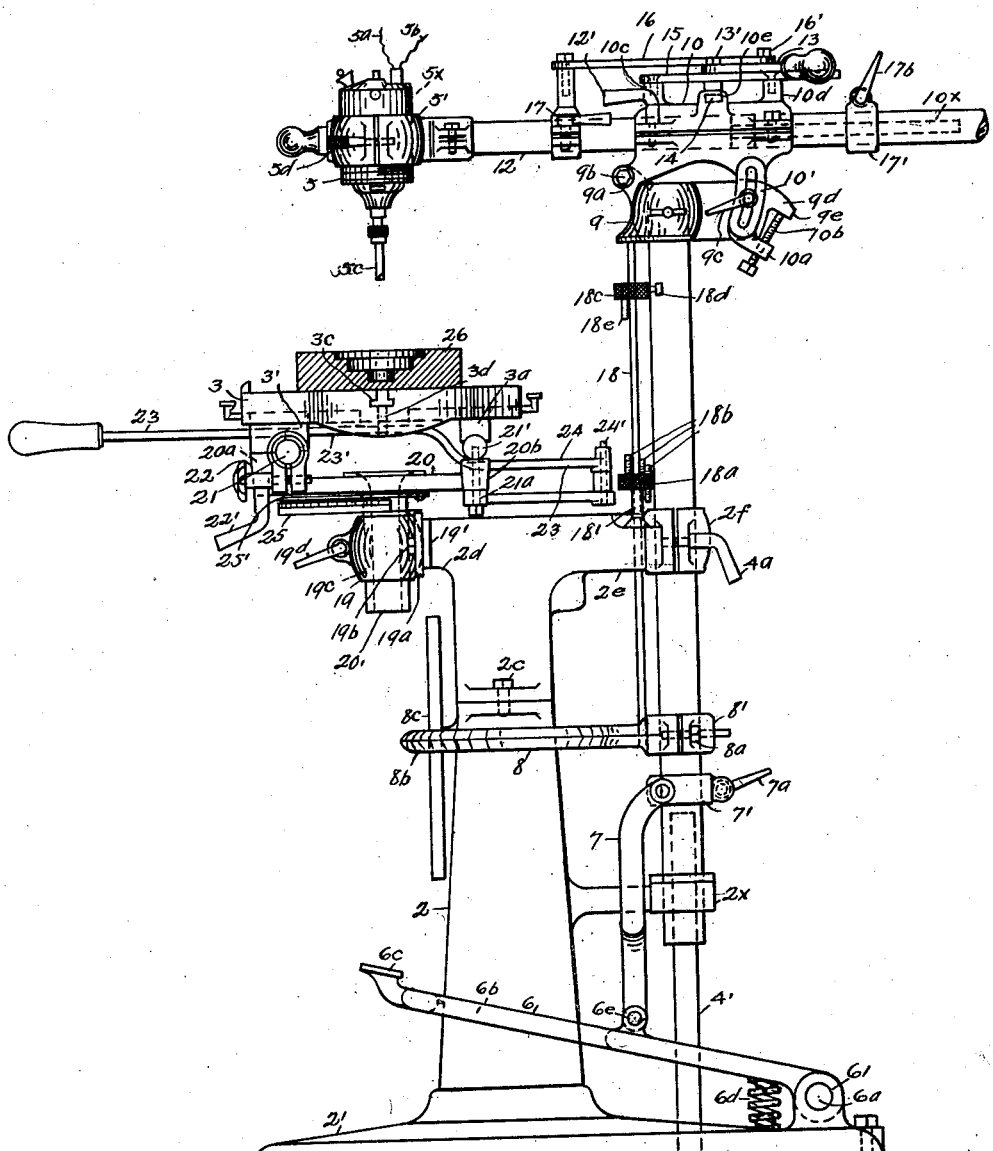

June 25, 1929.  R. L. CARTER  1,718,275
COMBINED ROUTER AND WORK SUPPORT
Filed Aug. 13, 1927  4 Sheets-Sheet 3
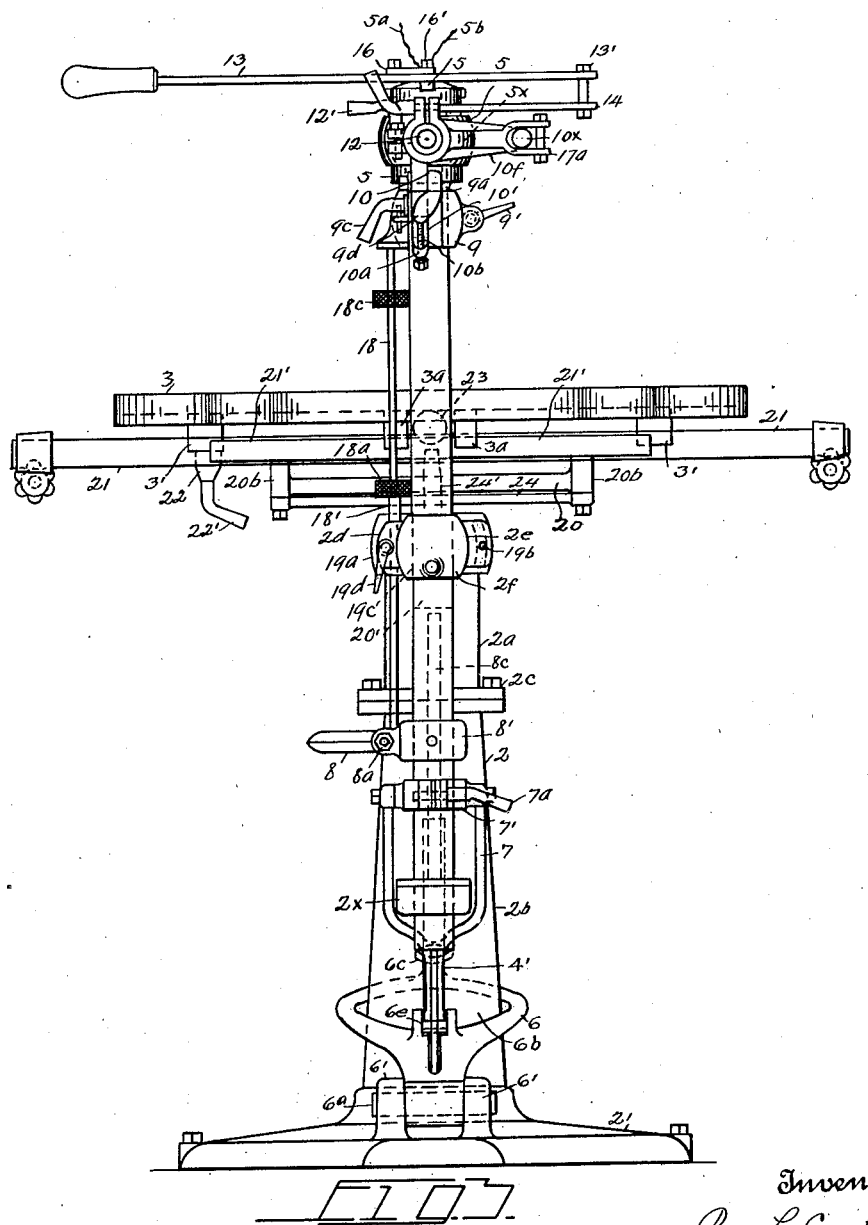
Inventor.
Ray L. Carter.
By Harry D. Wallace.
Attorney

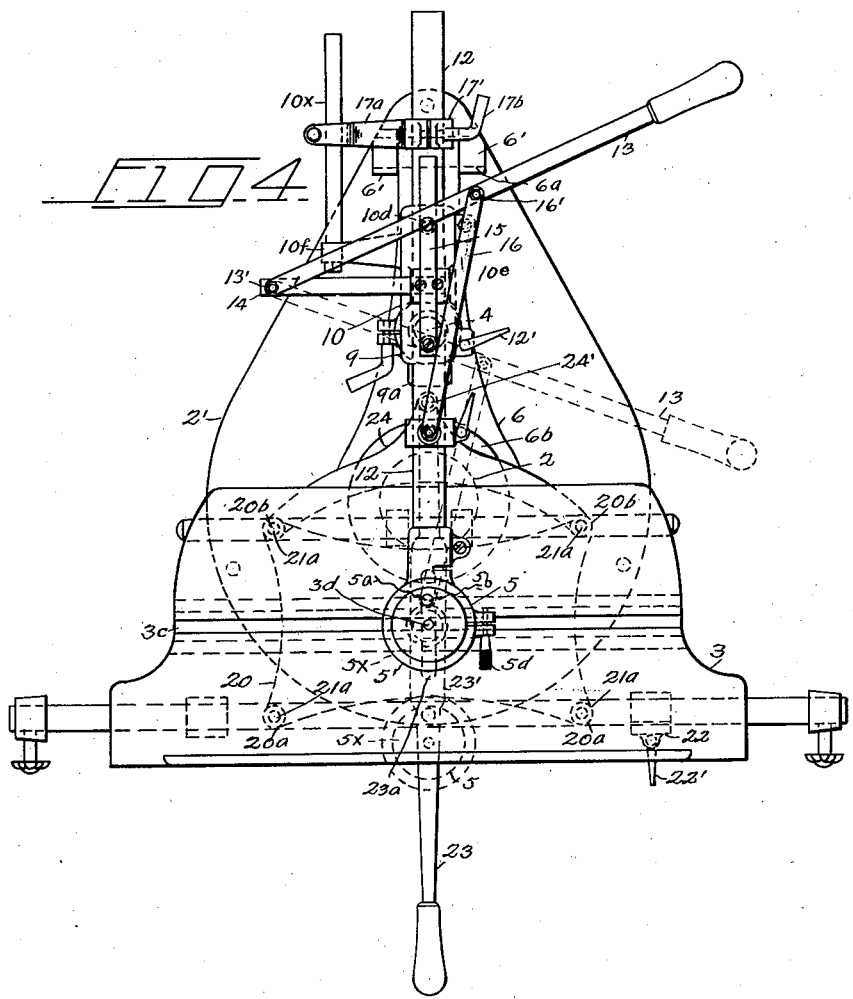

Patented June 25, 1929.

1,718,275

UNITED STATES PATENT OFFICE.

RAY L. CARTER, OF PHOENIX, NEW YORK.

COMBINED ROUTER AND WORK SUPPORT.

Application filed August 13, 1927. Serial No. 212,759.

This invention relates to a support for routing machines, and like power driven devices, and has for its primary object to provide a combined router and work support, comprising a table for directly supporting the work, the said table being movable in different planes, and being supported by a pedestal for conveniently positioning the work. A further object is to provide a reciprocable member, that supports the routing machine, and renders the router movable towards and from the work in a vertical plane, said member being controlled in its vertical movements by a pedal, and being guided by means rigid to the pedestal. A further object is to provide means for moving the router perpendicular to said member and transversely of the table, for performing routing work while the table is stationary, the table and the work being movable longitudinally and circularly for effecting routing work when the router is held stationary. A further object is to provide means for tilting the router relatively to the reciprocating member and the table, and also for rotating the router or said member in vertical, as well as horizontal planes. And a further object is to provide novel means for gaging the depth of the routing work, the said means being instantly adjustable for gaging different depths of the routing for the same work, without disturbing either the router or the table.

The various parts of this invention will be understood from the detailed description which follows and by reference to the accompanying drawings, in which—

Figure 1 is a front side elevation of the complete machine showing the router in the released position also showing the pedal for lowering the router to the work supported by the table. Fig. 2 is a side elevation taken in the direction of the arrow in Fig. 1 showing the means for adjusting the router vertically and horizontally as well as for tilting the router in the vertical plane. Fig. 3 is a rear side elevation. Fig. 4 is a top plan view; showing the router, the table, and related parts in the positions of Figs. 1, 2 and 3, also showing by full lines and dotted lines different positions of the lever that controls the horizontal movements of the router.

In the drawings, 2 represents generally a pedestal that supports all the parts of the device, and being formed with a flanged base 2′, that may be secured to a floor. The pedestal comprises upper and lower sections, $2^a$—$2^b$, which are usually bolted together, as at $2^c$. Section $2^a$ is preferably T-shaped, one arm $2^d$ extending forwardly and supporting the work-table, as 3, and related parts, the arm $2^e$ extending rearwardly, and being formed with means $2^f$, for guiding a vertically reciprocable rod or member 4, which supports a router 5 and other parts. Section $2^b$ of the pedestal is provided with a similar arm $2^x$, that guides the lower portion of the member 4. The lower end of rod 4 is preferably hollow and is guided by an axially alining member 4′, whose upper end telescopes said rod, the lower end of said guide-member being anchored in the base 2′ (see Fig. 2). The rod 4 is reciprocated by a pedal 6, which is pivoted between lugs 6′ formed near the rear margin of the base 2′, by a pin $6^a$. The body of the pedal is formed with an opening $6^b$, which loosely receives the pedestal 2, and its free end $6^c$ extends forwardly within convenient reach of the operator's feet. The pedal 6 is normally held released, as in Figs. 2 and 3, by a spring $6^d$. The rod 4 is pivotally connected to the pedal by a yoke 7, the bottom and top ends of the yoke being pivoted respectively to the pedal, as at $6^e$, and to a split collar 7′ which is clamped to the rod, and is rendered adjustable by a wing-bolt $7^a$, for varying the strokes of the pedal. The rod 4 may be locked against vertical movement by a bolt $4^a$, that controls the split guide $2^f$. The rod 4 is still further guided and steadied by a member 8, one end thereof comprising a split collar 8′, which receives and may be adjustably clamped to the rod, by a bolt $8^a$. The body of the member 8 partially encircles the pedestal, and its forward end $8^b$ is formed with a slot that slidably engages a stationary guide-bar $8^c$ carried by the pedestal. The top end of the member 4 is surmounted by a split head 9 which is clamped to the rod by a bolt 9′, and is provided with a forwardly facing perforated lug $9^a$, to which is pivoted a horizontal guide 10, by a bolt $9^b$, the said guide having a depending slotted arm 10′ on which is formed an angular perforated lug $10^a$. The guide 10 is swingable vertically on the pivot $9^a$ the extent of the slot in the arm 10′, and is held in the adjusted positions by a bolt $9^c$, which screws into a rearward extension $9^d$ of the head, the latter being formed with a similar angular lug $9^e$. A screw $10^b$ engages the lugs $9^e$ and $10^a$, and supplements the bolt 9ᶜ for holding the rear portions of the head and guide rigid when adjusted. The top of the guide 10 is formed with spaced upwardly projecting threaded hubs 10ᶜ—10ᵈ, a horizontally slotted boss 10ᵉ, and also a laterally extending perforated arm 10ᶠ. (See Figs. 2, 3 and 4.) The head 9 and guide 10 may be rotated on rod 4 by loosening the bolt 9′.

12 represents a horizontally disposed rod which directly supports the router 5, said rod being reciprocable in the guide 10, and may be held stationary in said guide by a bolt 12′. The forward end of the rod 12 is fitted with a split collar 5′, which is formed with a split hub arranged to be adjustably clamped to the rod. The collar 5′ adjustably supports the routing machine, including an enclosed motor 5ˣ, which may be supplied with current by wires 5ᵃ—5ᵇ, and is arranged to drive any suitable router-bit, as 5ᶜ. The collar 5′ may be clamped to the motor-casing, by a bolt 5ᵈ. The rod 12 is reciprocated horizontally by a lever 13, which is pivoted by a bolt 13′ to a laterally extending bar 14 that is supported by the slotted boss 10ᵉ. The lever 13 is slidably supported by a guide-bar 15, that is rigidly mounted upon the hubs 10ᶜ—10ᵈ, and said lever is operatively connected to the rods 12, by a link 16, one end of the link being pivoted to the lever, by a bolt 16′, its opposite end being pivoted to a split collar 17, which is adjustably clamped to the rod 12, between the router 5 and the head 9 (see Figs. 3 and 4). The rearward movements of the rod 12 and the router 5 are controlled and may be varied by the clamp 17, the forward movements of said rod may be likewise controlled by a similar clamping member 17′, which is adjustably mounted on said rod beyond the rear end of the guide 9, as may be understood by consulting Figs. 2 and 4. The arm 10ᶠ of guide 10 supports a short rod 10ˣ, which supplements the guide 10 for steadying and preventing accidental rotating of the rod 12. The rear end of rod 10ˣ slidably engages a forked arm 17ᵃ, which is integral with the stop 17′ (see Figs. 3 and 4). The downward movement of the rod 4 is controlled by a gage-rod 18, whose bottom end is anchored in the guide 8, the rod thence passing loosely through and being guided by the arm 2ᵉ of the pedestal, and its top-end engaging the under-side of the head 9. The rod 18 passes loosely through a sleeve 18′ supported by the arm 2ᵉ, and upon which is rotatably mounted a gage member 18ᵃ, the latter being fitted with a circular arrangement of adjustable upwardly facing gage-studs, as 18ᵇ (see Fig. 2), of different height. Near the head 9 the rod 18 is fitted with a similar adjustable gage member 18ᶜ, which may be made rigid to the rod by a set-screw 18ᵈ, and has a depending gage-stud 18ᵉ, which contacts with the studs 18ᵇ, when the latter are selectively disposed in the path of the stud 18ᵉ, for accurately gaging the different depths of the routing by the bit 5ᶜ, as shown in Fig. 2.

The arm 2ᵈ of the pedestal is formed with lateral flanges 19′, to which is removably attached a split head 19 that supports the table 3 and related parts. The head 19 is formed with correspondingly slotted flanges 19ᵃ (see Figs. 1, 2 and 3), the said parts being adjustably connected by bolts 19ᵇ. By this arrangement the table 3 may be tilted in a vertical plane the extent of said slots. The head 19 is bored out vertically, as at 19ᶜ, for pivotally supporting a plate or member 20, whose medial portion is formed with a depending hollow hub 20′ that journals in said bore (see Fig. 2), the said hub being clamped in said head at will, by a bolt 19ᵈ. The member 20 is provided near its four corners with upright bosses 20ᵃ—20ᵇ, which respectively support similar parallel guide-rods 21—21′, said rods being rigidly connected to the member by bolts 21ᵃ. The table is disposed above the plane of the rods 21—21′ and its underside is formed with depending guide-lugs 3′—3ᵃ that slidably engage the said rods, and by which the table may be moved longitudinally. The table retains its position on the guide-rods mainly by gravity, but it is preferably positively held from accidental detachment by a guide member 22, which frictionally engages the underside of the rod 21 and is adjustable by means of a bolt 22′ which may be employed for locking the table against said endwise movements (see Figs. 1, 2, and 3). The forward margin of the table is formed with an upwardly projecting lip against which certain work may be disposed. The top-face of the table 3 is formed with an inverted T-shaped groove 3ᶜ, similar to the tables of the well-known milling machines, for attaching various work supporting and securing devices (not shown). The table 3 is reciprocated on rods 21—21′ by a lever 23, the latter passing beneath and projecting beyond the rear edge of the table, and its rear-end is pivoted to a support 24, by a bolt 24′, the support 24 being bolted to the bosses 20ᵇ of plate 20, as shown in Figs. 1, 2 and 3. The medial portion 23′ of lever 23 is formed with a longitudinal slot 23ᵃ, which is engaged by a pin or stud 3ᵈ (see Fig. 2), that depends from the bottom of the table, and by which the table is shifted endwise by the corresponding movements of the lever 23 (see Fig. 4). The table 3 may be partially rotated in a vertical plane to the extent of the slots in the flanges 19ᵃ, by the loosening of bolts 19ᵇ (see Figs. 1 and 4). Below the plate 20 is disposed a stationary circular scale 25, having degree graduations readable in opposite directions from a central or zero mark, for accurately adjusting the table in a horizontal plane. The reading of the scale is facilitated by a pointer 25′ which is rigid to the bottom of plate 19 and is therefore movable with said plate and table 3. 26 represents a block of any suitable work which is mounted on the table 3 within range of the bit 5ᶜ (see Figs. 1 and 2) when the latter is lowered by depressing the pedal 6.

My device is capable of performing many different routing operations in connection with a great variety of work. The tool 5ᶜ is adapted to cut at many different angles as well as in straight and circular paths, within the relatively broad ranges of the several adjusting means, without requiring removal or substitution of any of the parts of the device, except the routing-bits. And all adjustments may be made readily and accurately by operators of ordinary skill.

Having thus described my invention, what I claim, is—

1. A combined router and work support, comprising a pedestal, a work table mounted on the pedestal, a vertically reciprocable member guided by said pedestal, a guide mounted on said member and swingable in a vertical plane, means reciprocable in and swingable with said guide one end of said means overhanging the table for supporting a router, a lever for moving the router transversely of the table, and a pedal for reciprocating said member.

2. A combined router and work support, comprising a pedestal having a forwardly extending arm and similar rearwardly facing arms, a vertically reciprocable member guided by the latter arms, a pedal for raising and lowering said member, a guide-member pivoted adjacent the top end of said member and movable therewith, a table mounted on the forwardly extending arm of the pedestal, a rod reciprocable and rotatable in said guide-member its forward end adjustably supporting a router including a tool, a lever for reciprocating said rod for moving the router transversely of the table, means for moving the work-table for enabling the tool to cut different patterns while the said rod is stationary, and means for selectively gaging the depths of the cuts by the router.

3. In combination with a T-shaped pedestal, a vertically slidable member carried by one end of the pedestal head, foot controlled means for sliding said member, a tool carrying member, means to slidably mount said tool carrying member on said vertically slidable member, a support having a depending hub, a holder carried by the other end of the pedestal head and rotatably receiving said hub, means to adjustably connect said holder to the pedestal head so as to permit the support to be adjusted to lie at an incline, a work table, means to mount the table on the support for slidable movement at right angles to the line of movement of the tool carrying member, mechanism for sliding the tool carrying member, and mechanism for sliding the work table.

4. In combination with a pedestal having a base and a work table thereon, guides carried by the pedestal and projecting outwardly therefrom, a vertically slidable member in the guides, a tool carrier connected to the member, a guide secured to the base and spaced from the pedestal and having a telescopic connection with the lower end of said vertically slidable member, a foot pedal, a clamp vertically adjustable on the vertically slidable member, and a connection pivoted to the clamp and to the pedal to operate the member by the pedal.

5. In combination with a pedestal having a base and a work table thereon, guides carried by the pedestal and projecting outwardly therefrom, a vertically slidable member in the guides, a tool carrier connected to the member, a guide secured to the base and spaced from the pedestal and having a telescopic connection with the lower end of said vertically slidable member, a foot pedal, means adjustable on the vertically slidable member, and means connected to the last named means and to the pedal whereby to actuate said vertically slidable member by the pedal.

6. In combination with a pedestal having a base and a work table thereon, guides carried by the pedestal and projecting rearwardly therefrom, a vertically slidable member in the guides, a tool carrier connected to the member, a guide secured to the base and spaced rearwardly from the pedestal and having a telescopic connection with the lower end of said vertically slidable member, a foot pedal, and means to operate the vertically adjustable member by the pedal.

7. In combination with a pedestal, and a work table thereon, guides carried by the pedestal, a vertically slidable member in the guides, a tool carrier connected to the member, a transverse member carried by the vertically slidable member, a vertical guide rod rigidly carried by the front portion of the pedestal, said transverse member being formed to slidably engage the rod, and means to operate the vertically slidable member.

8. In combination with a pedestal having a T-shaped head, a vertically slidable member carried by one end of the pedestal head, means for sliding said member, a tool carrying member, means to slidably mount said tool carrying member on said vertically slidable member, a work table, means to slidably support the work table, means to mount the work table supporting means on the other end of the pedestal head for angular adjustments at right angles to the line of movement of the tool carrying member, means for sliding the tool carrying member, and means for sliding the work table.

9. In combination with a work holder, a vertically slidable stem, a head on the upper end of the stem having a rearwardly projecting part, a guide pivoted at its forward portion to the front of the head and being in vertical alinement therewith, means rearwardly of the pivot to adjustably clamp the guide to said rearwardly projecting part of the head and against movement about said pivot, means to slide said member, and a tool carrying member connected to the guide.

10. In combination with a pedestal having a vertical bearing at its top, an intermediate support having a depending vertically disposed hub rotatably mounted in said bearing of the pedestal, a work table on the intermediate support, means to slidably mount the work table on the support, a lever between the work table and support and pivoted intermediate its ends to the work table, means to pivotally connect the rear end of the lever to the support, and tool carrying means overlying the work table.

11. In combination with a pedestal having a head, a member disposed above the top of the pedestal head and having a depending vertically disposed hub, a bearing pivotally carried by the pedestal head and rotatably receiving the hub, means to adjustably secure said bearing on the pedestal head so as to enable the hub and thereby the member to occupy varying inclined positions, a work table movable on the member, and tool carrying means disposed above the work table.

In testimony whereof I affix my signature.

RAY L. CARTER.